US012791402B2

(12) United States Patent
Hsieh et al.

(10) Patent No.: US 12,791,402 B2
(45) Date of Patent: Nov. 10, 2026

(54) ADAPTIVE TEMPERATURE SLOPE CALIBRATION METHOD OF A THERMAL SENSOR AND ASSOCIATED SYSTEM

(71) Applicant: MEDIATEK INC., Hsin-Chu (TW)

(72) Inventors: Min-Hang Hsieh, Hsinchu City (TW); Jyun-Jia Huang, Hsinchu City (TW); Chien-Sheng Chao, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 843 days.

(21) Appl. No.: 17/990,730

(22) Filed: Nov. 20, 2022

(65) Prior Publication Data

US 2023/0228629 A1 Jul. 20, 2023

Related U.S. Application Data

(60) Provisional application No. 63/299,420, filed on Jan. 14, 2022.

(51) Int. Cl.
*G01K 15/00* (2006.01)
*G01K 7/01* (2006.01)

(52) U.S. Cl.
CPC ............ *G01K 15/005* (2013.01); *G01K 7/01* (2013.01)

(58) Field of Classification Search
CPC .............................. G01K 15/005; G01K 7/01
See application file for complete search history.

(56) References Cited

U.S. PATENT DOCUMENTS 5,931,580 A 8/1999 Wyland
6,626,835 B1 9/2003 Kraus
6,996,491 B2 * 2/2006 Gold ...................... G06F 1/206 702/132
7,497,615 B2 3/2009 Kim et al.
7,752,909 B2 7/2010 Kamiunten et al.
8,626,465 B2 1/2014 Moore
9,184,380 B2 11/2015 Manaka
2020/0103289 A1 * 4/2020 Horng ...................... G01K 7/01
2024/0131213 A1 * 4/2024 Dycher .................. A61L 9/037

FOREIGN PATENT DOCUMENTS

| | | |
|---|---|---|
| CN | 102175347 | 9/2011 |
| CN | 105210188 | 12/2015 |
| DE | 10 2015 109 737 A1 | 12/2015 |
| ES | 2610677 T3 | 4/2017 |

(Continued)

OTHER PUBLICATIONS

Zhao et al., "The Research of Dynamic Calibration of Thermal Sensors", Journal of Electronic Measurement and Instrument, vol. 15, No. 3, Sep. 2001, pp. 25-29, China, Sep. 2001.

*Primary Examiner* — Lee E Rodak
*Assistant Examiner* — Byung Ro Lee
(74) *Attorney, Agent, or Firm* — Winston Hsu

(57) ABSTRACT

The present invention provides an adaptive temperature slope calibration method of a thermal sensor, wherein the method includes the steps of: obtaining a parameter of the thermal sensor under a temperature environment; calibrating a temperature slope of the thermal sensor by using the parameter of the thermal sensor obtained under the temperature environment without using parameter(s) of the thermal sensor under other temperature environment(s); and storing the temperature slope of the thermal sensor for subsequent use of detecting temperature.

12 Claims, 4 Drawing Sheets

(56) References Cited

FOREIGN PATENT DOCUMENTS

| | | | |
|---|---|---|---|
| GB | 2451572 | A | 2/2009 |
| KR | 101489104 | B1 | 2/2015 |
| KR | 10-2018-0024373 | | 3/2018 |
| TW | 201428247 | A | 7/2014 |
| TW | 201602531 | A | 1/2016 |
| WO | 98/55842 | | 12/1998 |

* cited by examiner

ADAPTIVE TEMPERATURE SLOPE CALIBRATION METHOD OF A THERMAL SENSOR AND ASSOCIATED SYSTEM

CROSS REFERENCE TO RELATED APPLICATIONS

This application claims the benefit of U.S. Provisional Application No. 63/299,420, filed on Jan. 14, 2022. The content of the application is incorporated herein by reference.

BACKGROUND

Abase-emitter junction of a bipolar junction transistor (BJT) has a predictable transfer function that is dependent on temperature. So, one or more BJTs can be used to measure a temperature of a device. Due to the semiconductor process variation, the thermal sensor needs to be calibrated to determine an offset and a temperature slope for further use, wherein calibrating the temperature slope requires obtaining two BJT parameters at two different temperature environments such as 30° C. and 85° C., and then these two BJT parameters and two different temperatures are used to determine the temperature slope. However, establishing two different temperature environments requires higher costs and also makes the time to calibrate the temperature slope longer.

SUMMARY

It is therefore an objective of the present invention to provide an adaptive temperature slope calibration method and related system, which can determine the temperature slope of the thermal sensor by the BJT parameter(s) obtained in only one temperature environment, to solve the above-mentioned problems.

According to one embodiment of the present invention, an adaptive temperature slope calibration method of a thermal sensor comprises the steps of: obtaining a parameter of the thermal sensor under a temperature environment; calibrating a temperature slope of the thermal sensor by using the parameter of the thermal sensor obtained under the temperature environment without using parameter (s) of the thermal sensor under other temperature environment(s); and storing the temperature slope of the thermal sensor for subsequent use of detecting temperature.

According to one embodiment of the present invention, a system comprising a thermal sensor, a sensing circuit and a temperature slope calibration unit is disclosed. The sensing circuit is configured to obtain a parameter of the thermal sensor under a temperature environment. The temperature slope calibration unit is configured to calibrate a temperature slope of the thermal sensor by using the parameter of the thermal sensor obtained under the temperature environment without using parameter(s) of the thermal sensor under other temperature environment(s), wherein the temperature slope of the thermal sensor is stored for subsequent use of detecting temperature.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
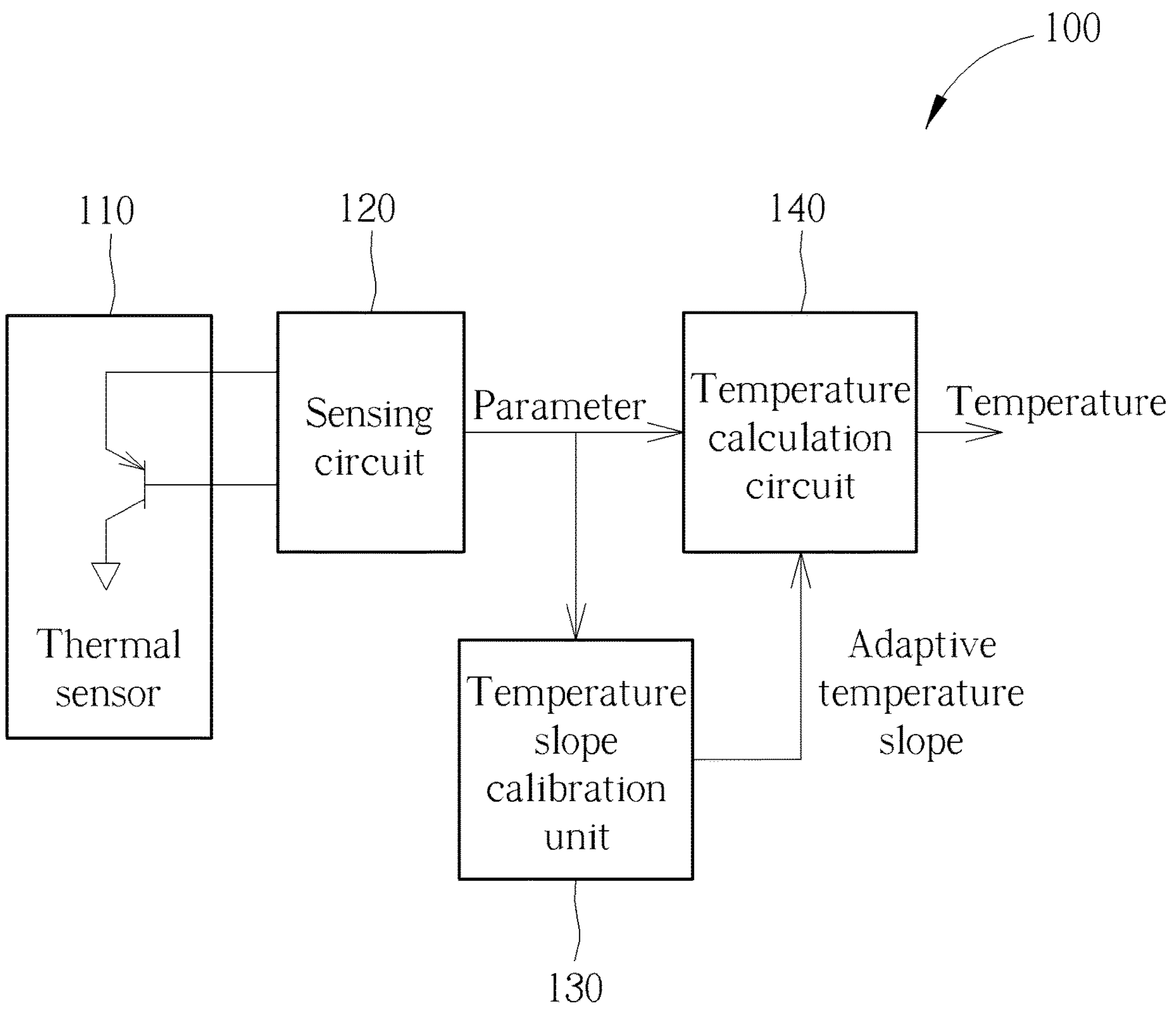
FIG. 1 is a system according to one embodiment of the present invention.

FIG. 1 is a system 100 according to one embodiment of the present invention. As shown in FIG. 1, the system 100 comprises a thermal sensor 110, a sensing circuit 120, a temperature slope calibration unit 130 and a temperature calculation circuit 140. In this embodiment, the thermal sensor 110 comprises at least one BJT, and the system 100 is configured to use parameter(s) of the BJT to obtain calibration a temperature slope to determine a current temperature of a device comprising the thermal sensor 110.

As described in the background of the invention, the conventional temperature slope calibration needs to be performed at two different temperatures, and establishing two different temperature environments requires higher costs and also makes the time to calibrate the temperature slope longer. To solve this problem, the system 100 is designed to use the BJT parameter obtained in only one temperature environment to determine the temperature slope. Specifically, the device comprising the thermal sensor 110 can be positioned in the environment with a normal temperature such as 30° C., and the sensing circuit 120 senses the thermal sensor 110 to obtain a parameter of the thermal sensor 110. In one embodiment, the parameter can be a base-emitter voltage (VBE) of the BJT, wherein the base-emitter voltage can be obtained by applying a fixed bias current to the BJT and measuring a voltage difference between a base electrode and an emitter electrode. In one embodiment, the parameter can be a delta base-emitter voltage (delta VBE) of the BJT, wherein the delta base-emitter voltage can be obtained by applying a fixed bias current to two or more BJTs and calibrating a difference between the base-emitter voltages of the two or more BJTs. In one embodiment, the base-emitter voltage of the BJT or the delta base-emitter voltage of the BJT can be encoded or performed by an analog-to-digital converting operation to generate a code to serve as the parameter of the thermal sensor 110. In one embodiment, the base-emitter voltage of the BJT or the delta base-emitter voltage of the BJT can be processed by a voltage-tofrequency converter to generate a frequency signal. In one embodiment, the parameter can be a current of the BJT. It is noted that the above embodiments are for illustrative, not a limitation of the present invention. As long as the parameter is generated according to a measuring result of the BJT, the parameter can have any type.

After obtaining the parameter of the thermal sensor 110 under the normal temperature (single temperature), the temperature slope calibration unit 130 uses the parameter to calculate the temperature slope of the thermal sensor 110. In this embodiment, the temperature slope of the thermal sensor 110 can be calculated by using the following formula:

$$T\_slope = T\_slope\_golden + ((P\_calibrate/P\_golden) - 1) * C \quad (1);$$

wherein "T_slope" is the adaptive temperature slope, "P_calibrate" is the parameter of the thermal sensor 110 under the normal temperature, "T_slope_golden" is a reference value of the temperature slope, "P_golden" is a reference value of the parameter of the thermal sensor 110, and "C" is a constant. By using the above formula (1), the temperature slope of the thermal sensor 110 can be easily calculated by using only one parameter sensed by the sensing circuit 120.

Figure 2:
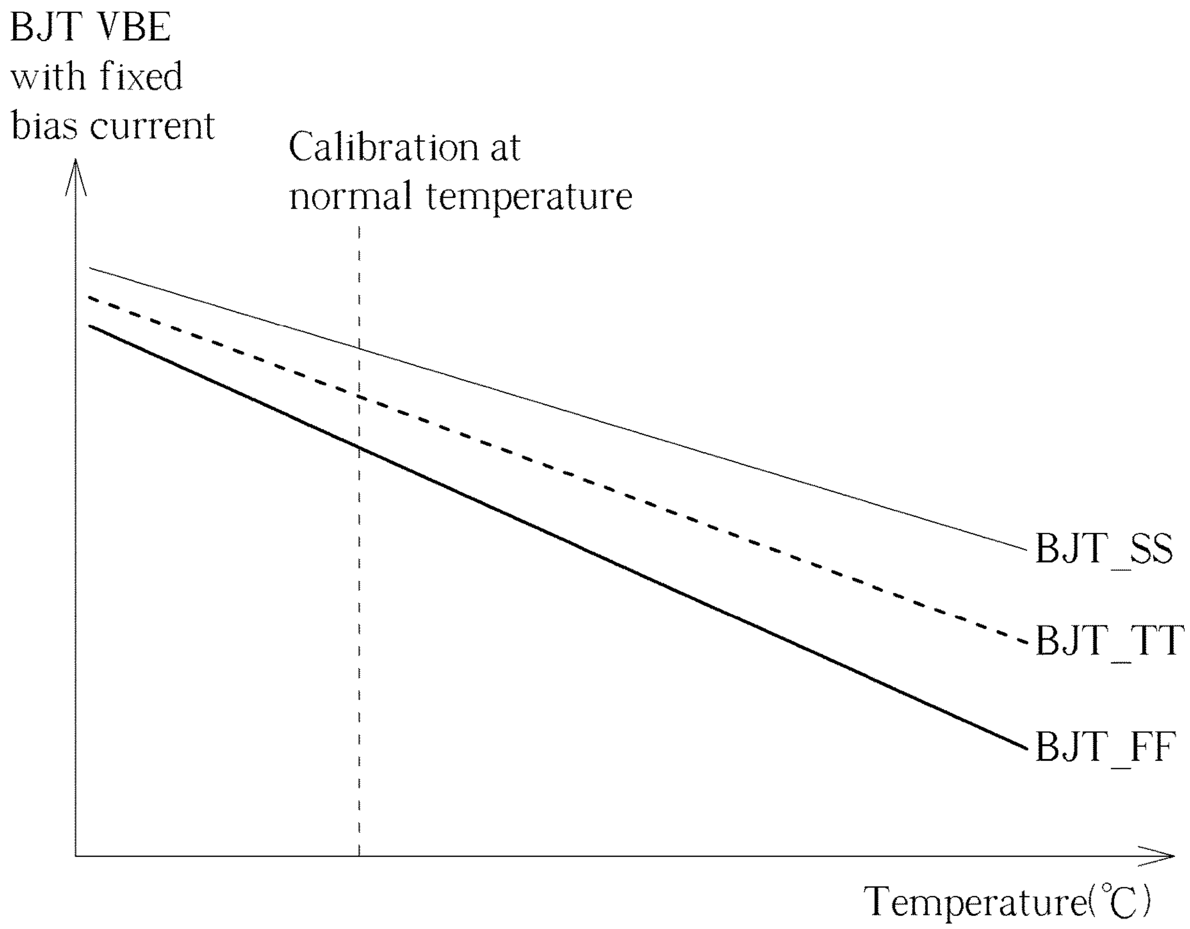
FIG. 2 is a diagram showing different corner cases and the corresponding temperature slopes according to one embodiment of the present invention.

FIG. 2 is a diagram showing different corner cases and the corresponding temperature slopes according to one embodiment of the present invention. As shown in FIG. 2, the parameter is the base-emitter voltage, and the base-emitter voltage of the thermal sensor 110 is linear with temperature. By using the formula (1), the slope of the linear relationship between the base-emitter voltage of the thermal sensor 110 and the temperature can be determined, for any corner case of the thermal sensor 110 (e.g., slow BJT (BJT_SS), typical BJT (BJT_TT) and fast BJT (BJT_FF) shown in FIG. 2).

Figure 3:
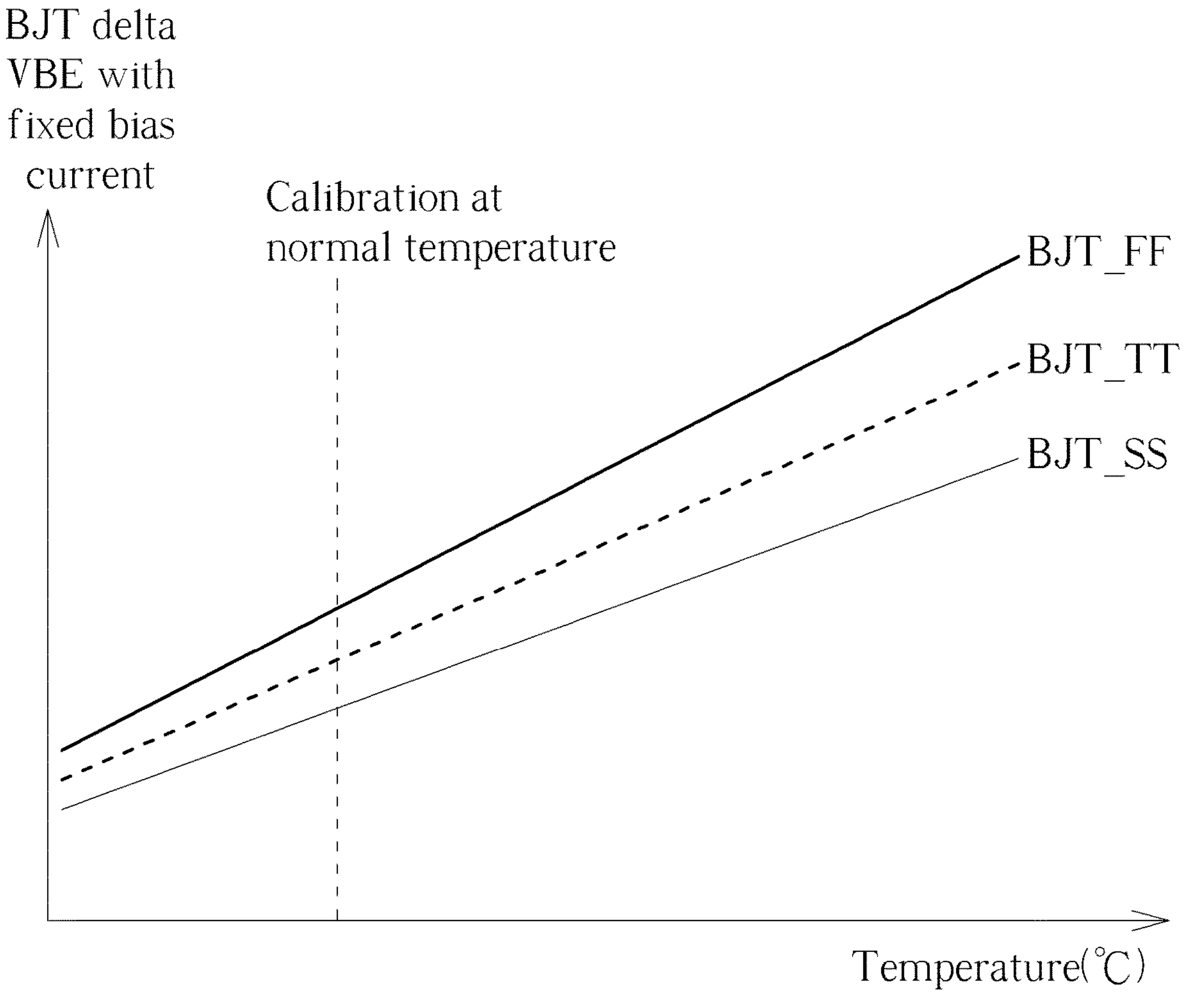
FIG. 3 is a diagram showing different corner cases and the corresponding temperature slopes according to another embodiment of the present invention.

FIG. 3 is a diagram showing different corner cases and the corresponding temperature slopes according to another embodiment of the present invention. As shown in FIG. 3, the parameter is the delta base-emitter voltage, and the delta base-emitter voltage of the thermal sensor 110 is linear with temperature. By using the formula (1), the slope of the linear relationship between the delta base-emitter voltage of the thermal sensor 110 and the temperature can be determined, for any corner case of the thermal sensor 110 (e.g., slow BJT (BJT_SS), typical BJT (BJT_TT) and fast BJT (BJT_FF) shown in FIG. 3).

It is noted that the above formula (1) is for illustrative, not a limitation of the preset invention. In other embodiments, as long as the temperature slope of the thermal sensor 110 can be easily calculated by using the parameter sensed by the sensing circuit 120 under a single temperature, the temperature slope can be obtained by using other calculation steps, for example, the temperature slope may be a quadratic function of the parameter.

In addition, the parameter obtained under the normal temperature can serve as an offset, for subsequent use when the system 100 needs to detects temperature.

After the temperature slope calibration unit 130 determines the adaptive temperature slope, the temperature calculation circuit 140 can store this temperature slope and uses this temperature slope with the offset to determine the temperature. For example, when the system 100 needs to determine the temperature, the temperature calculation circuit 140 can use the currently sensed parameter of the thermal sensor 110 and the previously determined temperature slope and offset to calculate the current temperature, that is the current temperature is equal to the temperature slope multiplied by the currently sensed parameter plus the offset.

Figure 4:
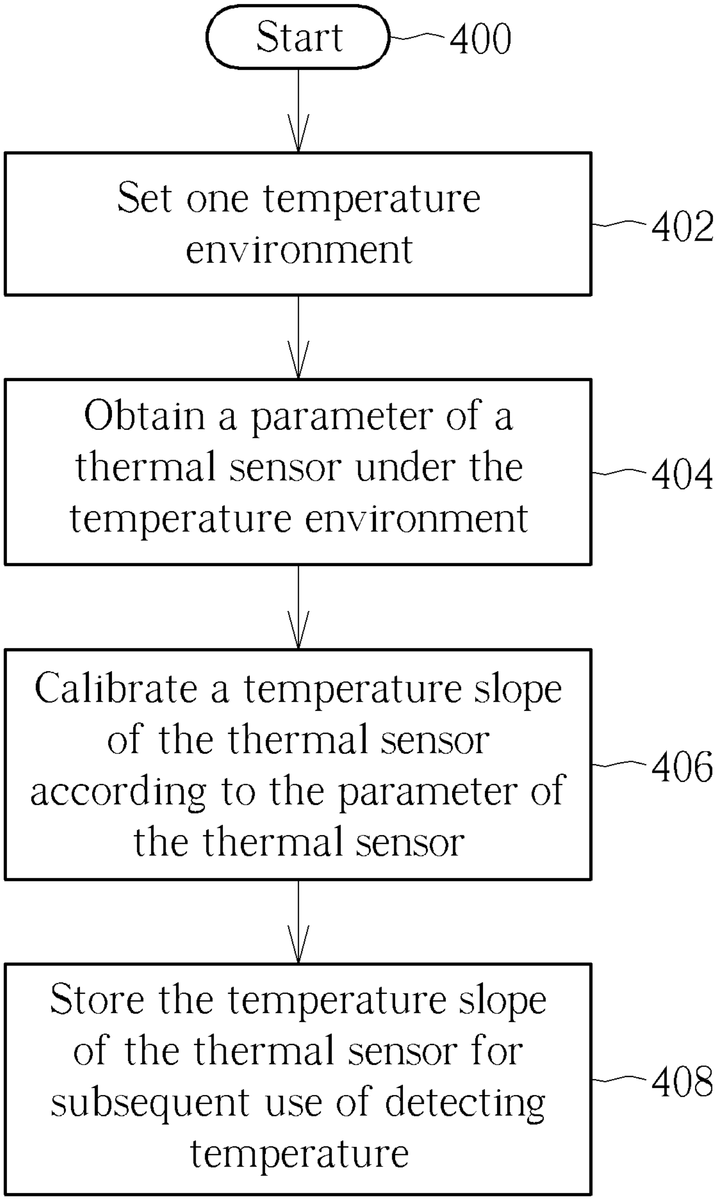
FIG. 4 is a flowchart of an adaptive temperature slope calibration method according to one embodiment of the present invention.

FIG. 4 is a flowchart of an adaptive temperature slope calibration method according to one embodiment of the present invention. Referring to FIG. 4 and above embodiments, the flow is described as follows.

Step 400: the flow starts.

Step 402: set one temperature environment.

Step 404: obtain a parameter of a thermal sensor under the temperature environment.

Step 406: calibrate a temperature slope of the thermal sensor according to the parameter of the thermal sensor.

Step 408: store the temperature slope of the thermal sensor for subsequent use of detecting temperature.

Briefly summarized, in the adaptive temperature slope calibration method of the present invention, the temperature slope can be calculated by using the BJT parameter(s) obtained in only one temperature environment. Therefore, since only one temperature environment is required to be established, the calibration step has lower costs and the system can complete the temperature slope calibration in a short time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adaptive temperature slope calibration method of a thermal sensor, comprising:

obtaining a parameter of the thermal sensor under a temperature environment;

calibrating a temperature slope of the thermal sensor by using the parameter of the thermal sensor obtained under the temperature environment without using parameter(s) of the thermal sensor under other temperature environment(s);

storing the temperature slope of the thermal sensor for subsequent use of detecting temperature; and operating the thermal sensor to detect a current temperature of a device comprising the thermal sensor by applying the calibrated temperature slope to a currently sensed parameter of the thermal sensor;

wherein the step of calibrating the temperature slope of the thermal sensor by using the parameter of the thermal sensor obtained under the temperature environment without using the parameter(s) of the thermal sensor under the other temperature environment(s) comprises:

modifying a reference temperature slope according to a ratio between the parameter and a reference parameter value to obtain the temperature slope of the thermal sensor.

2. The adaptive temperature slope calibration method of claim 1, wherein the thermal sensor comprises at least one bipolar junction transistor (BJT), and the step of obtaining the parameter of the thermal sensor under the temperature environment comprises:

generating the parameter of the thermal sensor according to a base-emitter voltage of the BJT.

3. The adaptive temperature slope calibration method of claim 1, wherein the thermal sensor comprises at least one BJT, and the step of obtaining the parameter of the thermal sensor under the temperature environment comprises:

generating the parameter of the thermal sensor according to a delta base-emitter voltage of the BJT.

4. The adaptive temperature slope calibration method of claim 1, wherein the thermal sensor comprises at least one BJT, and the step of obtaining the parameter of the thermal sensor under the temperature environment comprises:

generating a frequency signal to serve as the parameter of the thermal sensor according to a base-emitter voltage of the BJT or a delta base-emitter voltage of the BJT.

5. The adaptive temperature slope calibration method of claim 1, wherein the thermal sensor comprises at least one BJT, and the step of obtaining the parameter of the thermal sensor under the temperature environment comprises:

generating the parameter of the thermal sensor according to a current of the BJT.

6. The adaptive temperature slope calibration method of claim 1, wherein the step of modifying the reference temperature slope according to the ratio between the parameter and the reference parameter value to obtain the temperature slope of the thermal sensor comprises:

calculating the temperature slope of the thermal sensor by using a formula: T_slope=T_slope_golden+((P_calibrate/P_golden)−1)*C, wherein "T_slope" is the temperature slope, "P_calibrate" is the parameter of the thermal sensor obtained under the temperature environment, "T_slope_golden" is the reference temperature slope, "P_golden" is the reference parameter value, and "C" is a constant.

7. A system, comprising:

a thermal sensor;

a sensing circuit, coupled to the thermal sensor, configured to obtain a parameter of the thermal sensor under a temperature environment; and a temperature slope calibration circuit, configured to calibrate a temperature slope of the thermal sensor by using the parameter of the thermal sensor obtained under the temperature environment without using parameter(s) of the thermal sensor under other temperature environment(s), wherein the temperature slope of the thermal sensor is stored for subsequent use of detecting temperature;

wherein the system detects a current temperature of a device comprising the thermal sensor by applying the calibrated temperature slope to a currently sensed parameter of the thermal sensor;

wherein the temperature slope calibration circuit modifies a reference temperature slope according to a ratio between the parameter and a reference parameter value to obtain the temperature slope of the thermal sensor.

8. The system of claim 7, wherein the thermal sensor comprises at least one bipolar junction transistor (BJT), and the sensing circuit generates the parameter of the thermal sensor according to a base-emitter voltage of the BJT.

9. The system of claim 7, wherein the thermal sensor comprises at least one BJT, and the sensing circuit generates the parameter of the thermal sensor according to a delta base-emitter voltage of the BJT.

10. The system of claim 7, wherein the thermal sensor comprises at least one BJT, and the sensing circuit generates a frequency signal to serve as the parameter of the thermal sensor according to a base-emitter voltage of the BJT or a delta base-emitter voltage of the BJT.

11. The system of claim 7, wherein the thermal sensor comprises at least one BJT, and the sensing circuit generates the parameter of the thermal sensor according to a current of the BJT.

12. The system of claim 7, wherein the temperature slope calibration circuit calculates the temperature slope of the thermal sensor by using a formula: T_slope=T_slope_golden+((P_calibrate/P_golden)−1)*C, wherein "T_slope" is the temperature slope, "P_calibrate" is the parameter of the thermal sensor obtained under the temperature environment, "T_slope_golden" is the reference temperature slope, "P_golden" is the reference parameter value, and "C" is a constant.

* * * * *